(12) United States Patent
Ligon

(10) Patent No.: US 7,604,354 B1
(45) Date of Patent: Oct. 20, 2009

(54) THREE-DIMENSIONAL PROJECTION APPARATUS USING COAXIAL OPTICAL ALIGNMENT

(76) Inventor: Thomas R. Ligon, 4420 Roaring Fork Ct., Loveland, CO (US) 80538

( * ) Notice: Subject to any disclaimer, the term of this patent is extended or adjusted under 35 U.S.C. 154(b) by 568 days.

(21) Appl. No.: 11/382,526

(22) Filed: May 10, 2006

(51) Int. Cl.
*G03B 21/28* (2006.01)

(52) U.S. Cl. .............................. 353/30; 353/94; 353/78; 353/79; 352/69

(58) Field of Classification Search .................. 353/30, 353/94, 98, 99, 78, 77, 79; 352/69, 70
See application file for complete search history.

(56) References Cited

U.S. PATENT DOCUMENTS

| 4,588,382 A | 5/1986 | Peters |
| 4,645,319 A | 2/1987 | Fekete |
| 5,153,621 A * | 10/1992 | Vogeley ........................ 353/30 |
| 5,300,966 A * | 4/1994 | Uehira et al. .................. 353/30 |
| 5,502,481 A | 3/1996 | Dentinger |
| 5,835,247 A | 11/1998 | Monnier |
| 5,902,030 A * | 5/1999 | Blanchard ..................... 353/30 |
| 6,409,351 B1 * | 6/2002 | Ligon ........................... 353/98 |
| 6,513,938 B2 | 2/2003 | Kubota |
| 6,561,651 B1 | 5/2003 | Kubota |
| 6,814,443 B2 | 11/2004 | Safran |
| 6,896,375 B2 | 5/2005 | Peterson |
| 6,905,218 B2 * | 6/2005 | Courchesne ................. 353/122 |
| 7,118,228 B2 * | 10/2006 | May ............................. 353/99 |
| 2003/0007135 A1 * | 1/2003 | Sciammarella et al. ........ 353/98 |

* cited by examiner

*Primary Examiner*—William C Dowling
(74) *Attorney, Agent, or Firm*—Bert P. Krages, II

(57) ABSTRACT

A projection apparatus comprising a three-dimensional screen, a convex mirror, two or more projectors, and an assemblage of flat mirrored surfaces that share at least one common edge or apex that faces the convex mirror. The flat mirrored surfaces fold the images from separate projectors into a common image that has single optical axis aligned with principal axis of the convex mirror so that the combined image is reflected from the convex mirror onto the three dimensional screen.

20 Claims, 3 Drawing Sheets

THREE-DIMENSIONAL PROJECTION APPARATUS USING COAXIAL OPTICAL ALIGNMENT

CROSS-REFERENCED TO RELATED APPLICATIONS

None

FEDERALLY SPONSORED RESEARCH

No

SEQUENCE LISTING OR PROGRAM

Not Applicable

BACKGROUND OF THE INVENTION

Projecting images onto spherical and other three-dimensional projection screens presents several issues that bear on the quality of the images. The most significant problem faced by early versions of spherical screens was adequate coverage of the screen surface with an image. For example, systems that used multiple projectors mounted inside a spherical rear projection screen such as the one described in U.S. Pat. No. 3,586,432 provided very limited coverage of the screen and made it difficult to access the projectors for maintenance. Systems using external projectors, such as the kinds described in U.S. Pat. No. 4,427,274 and U.S. Pat. No. 4,859,053, provided better access to the projectors but were either limited to producing an image on a hemispherical screen or required projectors to be located at opposite ends of a sphere. These limitations have been substantially overcome by systems in which the projectors project the image onto one or two convex mirrors within the sphere from which the image is reflected onto the surface of the screen. This approach is well described in U.S. Pat. No. 6,409,351.

Two significant challenges associated with three-dimensional projection systems are the brightness and resolution of the image formed of the screens. Image brightness is largely a function of the light output of the projector and the surface area of the screen, although other variables such as the characteristics of the screen can be important. Light output from a projector is usually specified in terms of lumens for digital projectors and in terms of lamp wattage for film projectors. Another aspect of brightness is the flatness of the illumination field (i.e., the reduction of brightness from the center of the image to the edges). Although an ideal projector would produce images that do not suffer from falloff of brightness at the edges, all projectors experience this problem to varying degrees.

Resolution is a dominant factor in determining the sharpness and clarity of the image on the screen. For film projection systems, resolution has traditionally been specified as the resolving power expressed as line pairs per millimeter (lp/mm). The resolving power of digital projection systems is usually expressed in terms of the number of pixels used to form the image, typically provided in two numbers, such as 800×600, where the first number refers to the number of pixels from across the width of the display area, and the second number refers to the number of pixels across the height of the display area. Both the brightness and perceived resolution of the image will decrease as the image size increases, and at some point the brightness or the resolution become unacceptable to viewers as the size of the screen increases.

One practical consideration for three-dimensional projection display systems is the cost of the projectors needed to produce images with adequate levels of brightness and resolution. The vast majority of projectors are manufactured in a few standard formats and are known generally as commodity projectors. Although it is possible to manufacture projectors with a custom format, such projectors are prohibitively expensive for most applications. In addition, the cost of commodity projectors increase markedly as the brightness and resolution capabilities are increased. For example, an LCD projector with a 3000 lumen output and native resolution of 1024×768 pixels will typically cost about three times as much as an LCD with a 1500 lumen output and native resolution of 800×600 pixels.

Another practical consideration is the aspect ratios of commodity projectors. The most common aspect ratio for digital projectors is the 4:3 ratio used in standard-format computer monitors, televisions, and digital audio-visual presentation systems. However, there is a strong trend towards wide-format projection systems such as the high-definition television (HDTV) aspect of 16:9. This presents a problem for three-dimensional projection systems project images onto screens with spherical, hemispherical, and like configurations, because such systems require the projection of a circular image onto a mirror and thus can only use the height of the display area. For example, a projection system using a projector with a resolution 1920×1080 pixels will only be able to project a circular image of 1080 pixels diameter, thereby wasting much of the display potential of the projector. In the context of flat screen systems, issues concerning brightness, resolution, and aspect ratio are often addressed by concurrently using multiple projectors. For example, it is possible to use two projectors together to superimpose identical images onto a common screen to increase the brightness of an image. Similarly, multiple projectors can be used to tile images onto a screen. In both cases, the images from the physically-separated projectors converge at the screen and the problem of adequately registering the images from the physically-separated projectors is addressed by means such as keystone correction (trapezoidal distortion) or lens shifting (physically moving a lens off the central optical axis). However, these approaches to using multiple projectors do not work well with three-dimensional projection systems featuring convex mirrors in the optical path because the images do not converge until they reach the convex mirror surface. Unless the images are combined prior to reaching a convex mirror, they will suffer from image distortion and registration problems that cannot be corrected with keystone correction or other means of compensating for distortion.

There is a need for a three-dimensional projection system that overcomes the problems described above, which the present invention addresses as discussed hereafter. It is an object of the present invention to provide an effective and economical means of combining images from multiple projectors in the context of three-dimensional projection systems.

SUMMARY OF THE INVENTION

The present invention is a projection system comprising a three-dimensional screen, a convex mirror, two or more projectors, and an assemblage of flat mirrored surfaces that share at least one common edge that faces the convex mirror. The general principle underlying the system is that the flat mirrored surfaces fold the images from separate projectors into a tiled image that has single optical axis aligned with principal axis of the convex mirror so that the combined image is reflected from the convex mirror onto the three dimensional screen. For example, an embodiment consisting of two projectors might have the projectors opposingly situated so that they face 90 degrees away from the principal axis of the convex mirror, with each projector transmitting an image to a flat mirrored surface set at 45 degrees to the projector. Because, the flat mirrored surfaces share a common edge on the side nearest to the convex mirror, they fold the images from each projector 90 degrees and combines them into a tiled image that is directed to the convex mirror along its principal axis. The single image is thereafter reflected by the convex mirror onto the screen in the form of a virtual image.

A critical requirement for two-projector systems is that the flat mirrored surfaces share a common edge with a point located on the principal axis of the convex mirror. An practical embodiment of such an assemblage is a triangular prism made of glass in which the two leg faces are aluminized and the hypotenuse base is left uncoated. For systems that use three or more projectors, the flat mirrored surfaces need to share a common point forming an apex. For example, a system encompassing four projectors could utilize a quadrilateral-pyramid form in which the four triangular faces are aluminized to reflect light. The number of mirrored surfaces on the reflecting assemblage will correspond to the number of projectors. For example, a two-projector system will utilize a mirror assemblage with two mirrored surfaces that face the convex mirror.

A significant advantage of the present invention is that it enables two or more projectors to be combined to project a tiled image on a three-dimensional screen at greater resolution and brightness than can be achieved with a single commodity projector. One of the significant limitations of commodity projectors is that they are not specifically designed for tiled displays and therefor it is impossible to align multiple projectors so that the images match perfectly at the edges. Another significant limitation is that their images suffer from falloff of brightness at the edges. Left unaddressed, these limitations necessitate that a tiled image will either have a gap between the images or a bright seam where they overlap. In the case of digital projectors, a practical solution is to overlap the images by a sufficient amount and use software to modify the pixels in the overlap region so as to reduce the brightness to make the seam blend with the adjacent portions of the image. For example, if two projectors with at resolution of 1920×1080 pixels are combined using the means of the invention, a circular image with a diameter of 1920 pixels can be projected onto the convex mirror with an overlap of the two images of 120 pixels. Because this width constitutes a useful interval over which to smoothly blend the seam into the adjacent portions of the images, the present invention allows for a very efficient use of the projector potential. Further refinements to the projected images can be made by using software to modify the video input so as to correct for geometric distortions and uneven brightness.

BRIEF DESCRIPTIONS OF THE DRAWINGS

DESCRIPTION OF THE PREFERRED EMBODIMENT

Figure 1:
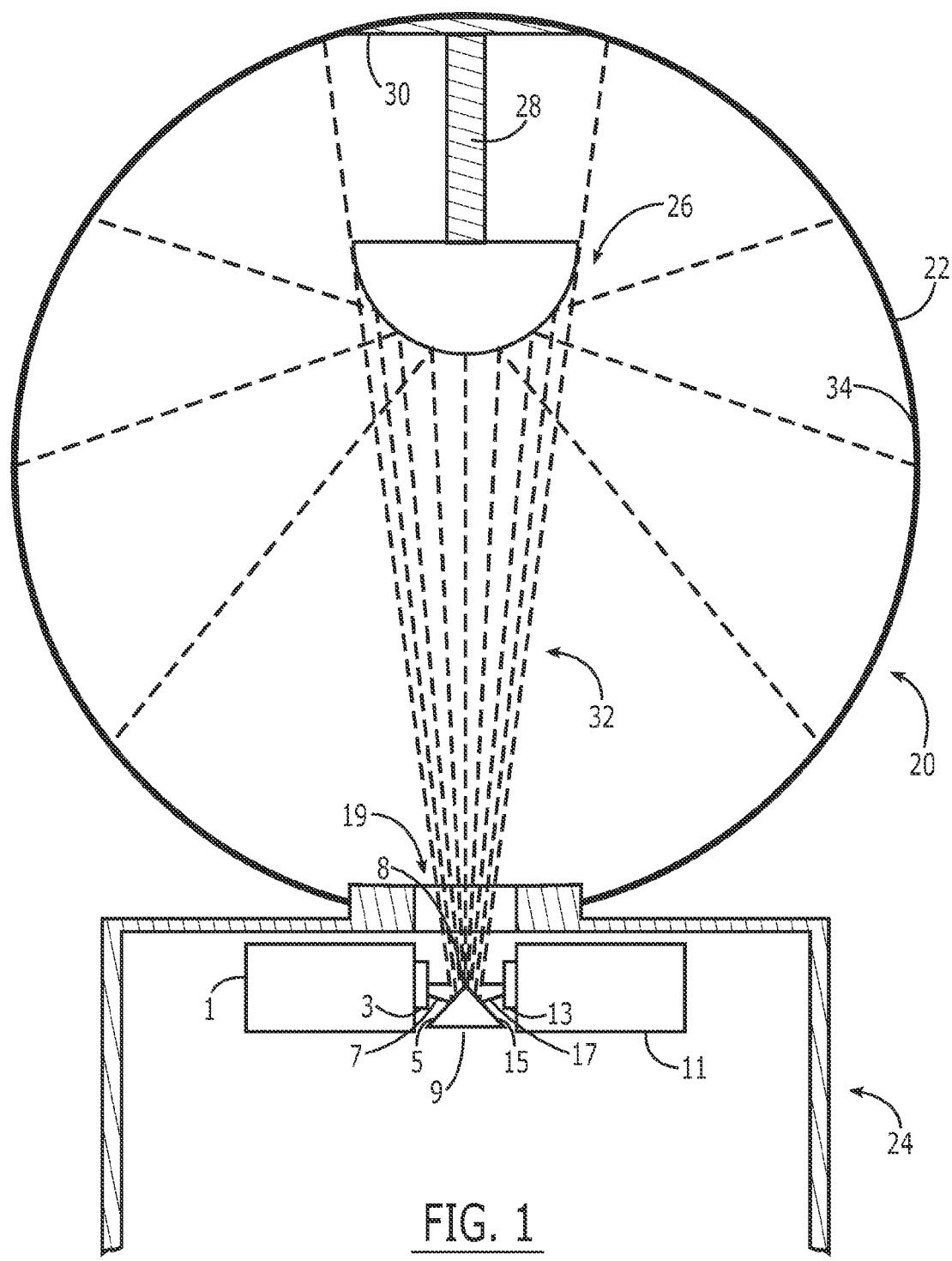
FIG. 1 is a sectional side view illustrating an embodiment of the system employing two projectors.

FIG. 1 shows a system in accordance with the invention employing a first projector 1 and a second projector 11 for producing an image on an outer surface 22 of a three-dimensional screen 20 in the form of a hollow sphere substantially enclosing a spherical space. The basic arrangement of the preferred embodiment is as follows. The screen 20 is secured to a base 24. A convex mirror 26 is suspended on a rod 28 extending downward from a mounting plate 30 attached to the screen 20. The first projector 1 and the second projector 11 are horizontally disposed within the base 24 with their lenses 3 and 13 opposingly facing a mirror assemblage 9 in the shape of a triangular prism and which comprises a first reflective surface 5 and a second reflective surface 15 which share a common apex edge 8. The apex edge 8 of mirror assemblage 9 is centered on the principal axis of convex mirror 26 and situated at 90-degree angles to the optical axes of lens 3 of projector 1 and lens 13 of projector 11. The first projector 1 projects an off-axis image 7 horizontally onto reflective surface 5 which reflects the image upward through an aperture 19 in screen 20 and onto the lower surface of convex mirror 26. Similarly, the second projector 11 projects an off-axis image 17 horizontally onto reflective surface 15 which reflects the image upward through an aperture 19 in screen 20 and onto the lower surface of convex mirror 26. Because reflective surface 5 and reflective surface 15 share a common apex edge, image 7 and image 17 are reflected upward and combined into a single image 32 having a common optical axis centered on apex edge 8 and in coincident alignment with the principal axis of convex mirror 26. The convex mirror 26 reflects the projected image 32, dispersing it over most of the inner surface 34 of screen 20. Because screen 20 is translucent, the image appears over most of the outer surface 22 of the screen except at the regions along the axis of projection obscured by the convex mirror 26 and the base 24.

Projector 1 and projector 11 may be any kind of projector for producing still or moving images but in the preferred embodiment of the invention illustrated in FIG. 1, they are digital projectors. When desired, the images produced by projector 1 and projector 11 may be appropriately corrected by using means such as software and off-axis projection to compensate for any distortion arising out of the geometry of the screen 20, convex mirror 26, or the mirror assemblage 9, so that the image is substantially free of distortions when projected on screen 20.

The mirror assemblage 9 is preferably constructed by aluminizing the faces of a triangular prism made of glass. In the preferred embodiment, the apex angle of the mirror assemblage is 90 degrees and the optical axes of lenses 3 and 13 are aligned horizontally such that their optical axes strike the reflective surfaces 5 and 15 at an incident angle of 45 degrees. However, other means of construction and other combinations of apex angles and orientations of the projectors may be used to achieve a substantially equivalent effect. For example, a mirror assemblage in which the angle of the apex 8 is 120 degrees can be used in conjunction with projectors in which the optical axis is aligned 30 degrees from the horizontal and strikes a reflective surface at an incident angle of 60 degrees. Similarly, it is possible to construct a mirror assemblage in which the apex angle is adjustable and thus accommodating selectable variations in the orientation of the projectors to the mirror assemblage.

Figure 2:
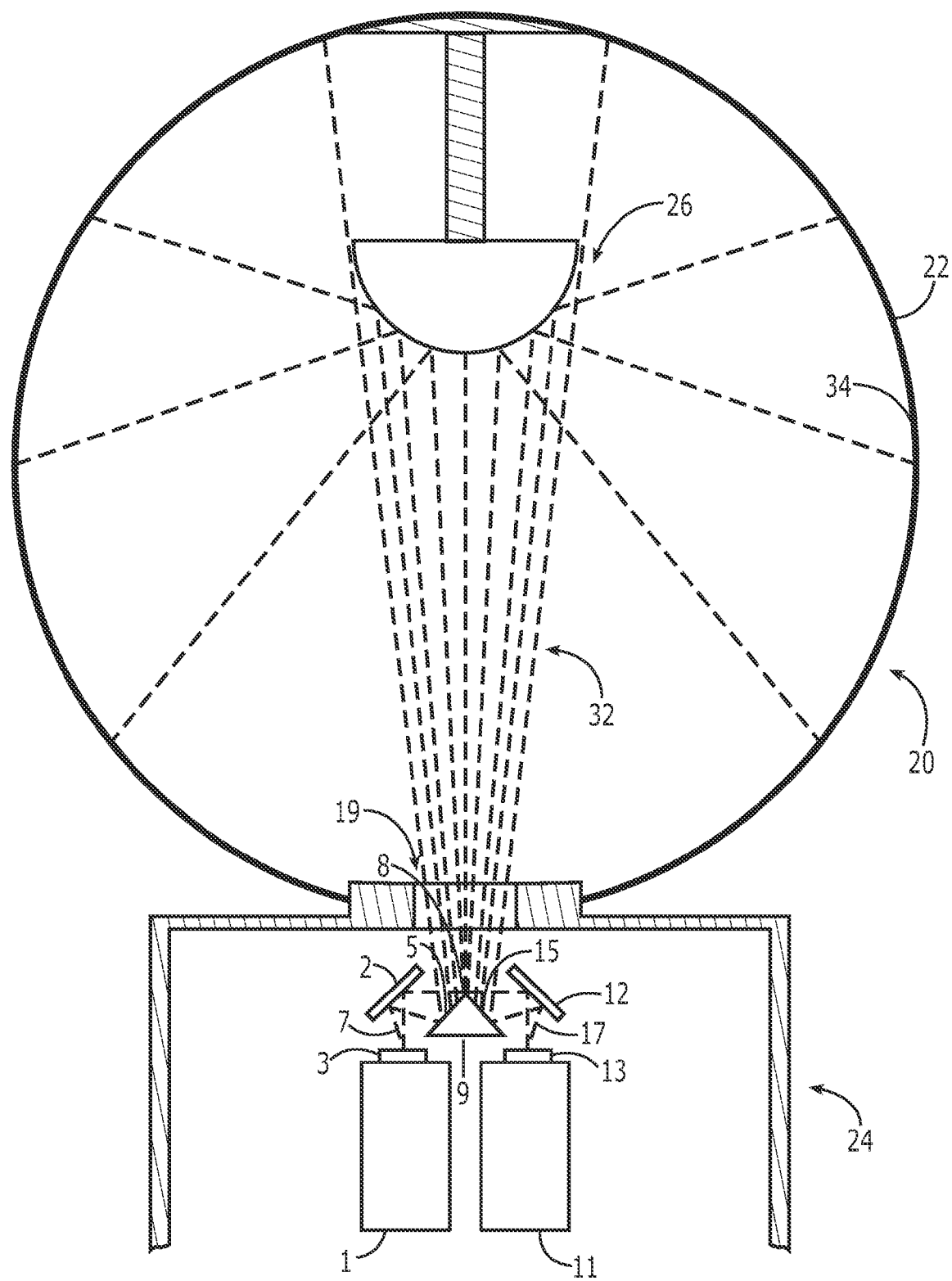
FIG. 2 is a sectional side view illustrating an alternative embodiment of the system employing two projectors.

FIG. 2 shows and alternative embodiment in which projector 1 and projector 2 are vertically disposed within base 24. The assembly of the screen 20, convex mirror 26, and base 24 are substantially the same as shown in FIG. 1. However, the lens 3 of the first projector 1 faces a first flat mirror 2 and the lens 13 of the second projector faces a second flat mirror 12. The first projector 1 projects an off-axis image 7 vertically onto the first flat mirror 2 which directs the image horizontally onto reflective surface 5 which in turn reflects the image upward through an aperture 19 in screen 20 and onto the lower surface of convex mirror 26. Similarly, the second projector 11 projects an off-axis image 17 vertically onto the second flat mirror 12 which directs the image horizontally onto reflective surface 15 which in turn reflects the image upward through an aperture 19 in screen 20 and onto the lower surface of convex mirror 26. In this illustrative embodiment, reflective surface 5 and reflective surface 15 are incorporated into a mirror assemblage 9 in the shape of a triangular prism and share a common apex edge 8 as described above with respect to the preferred embodiment. The apex edge 8 of mirror assemblage 9 is centered on the principal axis of convex mirror 26 and thus the images 7 and 17 are combined into a single image 32 having a common optical axis centered on apex edge 8 and in coincident alignment with the principal axis of convex mirror 26. The convex mirror 26 thus reflects the projected image 32 and disperses it over most of the inner surface 34 of screen 20.

Figure 3:
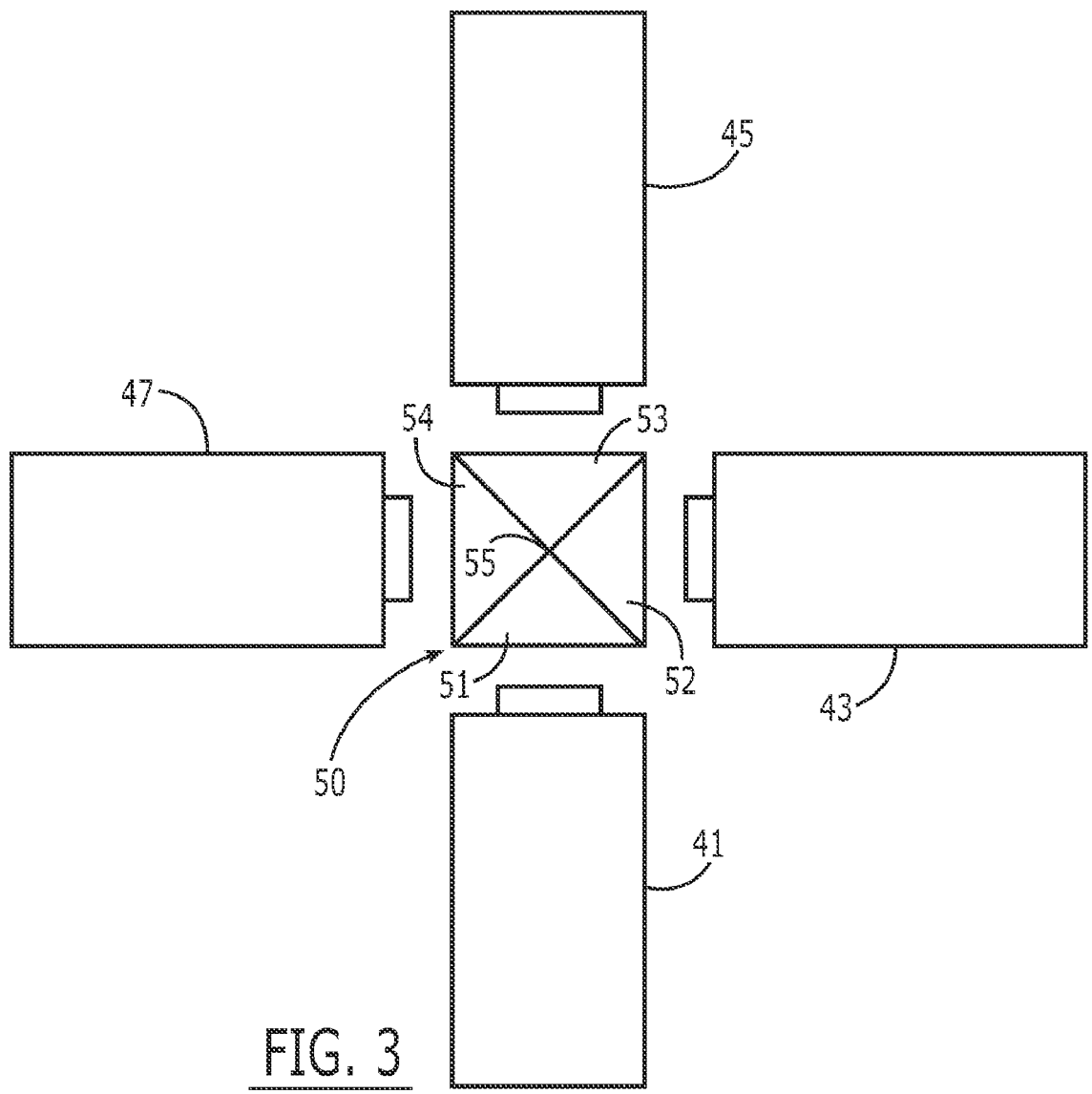
FIG. 3 is a top view illustrating an arrangement of four projectors directing images into a pyramidal-shaped assemblage of reflecting surfaces.

The invention is not limited to the use of two projectors. FIG. 3 shows in top view an example of how the projectors could be arranged in an embodiment in which four projectors are used in a system. The mirror assemblage 50 comprises pyramidal shape with four triangular reflective faces 51, 52, 53, and 54 which converge to an apex 55. Projector 41 is oriented to project an image onto reflective face 51 and is oppositely situated to projector 45 which is oriented to project an image onto reflective face 53. Projector 43 is situated at right angles to projector 41 and projector 45 and is oriented to project an image onto reflective face 52. Projector 47 is oppositely situated to projector 43 and is oriented to project an image onto reflective face 55. When the four images are reflected from the mirror assemblage 50, they combine to form a common image with its optical axis centered over the apex 55 of the mirror assemblage. By centering the apex 55 beneath the principal axis of convex mirror such as shown in FIGS. 1 and 2, the combined image can be dispersed over a three-dimensional screen as described in those figures.

There are various other possible arrangements of elements that one skilled in the art could substitute and obtain similar results as achieved herein. Such arrangements include the addition of reflective surfaces as well as alternate configurations of the optical elements described above. Likewise, the system can be embodied to produce images viewable from the outside of the space enclosed by the screen (i.e., rear-screen projection) or to produce images viewable from within the space enclosed by the screen (i.e. front-screen projection). All these possibilities are within the scope and spirit of this disclosure.

I claim:

1. A projection display apparatus comprising:
a screen having an inner surface substantially enclosing a three-dimensional space;
a mirror assemblage further comprising a first reflective face and a second reflective face, with said reflective faces sharing an apex edge;
a first projector for projecting a first image onto said first reflective face such that said first image is folded, said first projector being capable of focusing so that said first image is rendered in sharp focus on said inner surface;
a second projector for projecting a second image onto said second reflective face such that said second image is folded, said second projector being capable of focusing so that said second image is rendered in sharp focus on said inner surface;
a convex mirror positioned within said three-dimensional space to receive the first image and second image folded by said mirror assemblage and to disperse said images onto the inner surface of said screen.

2. The projection display apparatus of claim 1 in which the apex edge of the mirror assemblage lies at a right angle along the principal axis of said convex mirror on a point along said principal axis.

3. The projection display apparatus of claim 1 in which the screen is substantially spherical and has a central axis in coincident alignment with the principal axis of said convex mirror, and further in which the apex edge of the mirror assemblage lies at a right angle to the principal axis of said convex mirror at a point on said principal axis.

4. The projection display apparatus of claim 1 in which the screen is substantially hemispherical and has a central axis in coincident alignment with the principal axis of said convex mirror, and further in which the apex edge of the mirror assemblage lies at a right angle to the principal axis of said convex mirror at a point on said principal axis.

5. The projection display apparatus of claim 1 in which the screen is substantially spherical and has a central axis in coincident alignment with the principal axis of said convex mirror, and further in which the apex edge of the mirror assemblage lies at a right angle to the principal axis of said convex mirror at a point on said principal axis, and further in which the first projector and the second projector reside outside said three-dimensional space and wherein the mirror assemblage folds said first image and said second image onto said convex mirror through an aperture in said screen without having a lens in the optical path between the mirror assemblage and said convex mirror.

6. The projection display apparatus of claim 1 in which the screen is substantially spherical and has a central axis in coincident alignment with the principal axis of said convex mirror, and further in which the apex edge of the mirror assemblage lies at a right angle to the principal axis of said convex mirror at a point on said principal axis, and further in which the first projector and the second projector reside inside said three-dimensional space and wherein the mirror assemblage folds said first image and said second image onto said convex mirror without having a lens in the optical path between the mirror assemblage and said convex mirror.

7. The projection display apparatus of claim 1 in which the first image and the second image are corrected for geometric distortions by using software to modify the signal inputs to the first and second projectors.

8. The projection display apparatus of claim 1 in which the first image and the second image are corrected for uneven brightness by using software to modify the signal inputs to the first and second projectors.

9. The projection display apparatus of claim 1 in which said first projector is a digital projector having a pixel ratio of 16:9 and said second projector is a digital projector having a pixel ratio of 16:9.

10. The projection display apparatus of claim 1 in which said first projector is a digital projector having a pixel ratio of 4:3 and said second projector is a digital projector having a pixel ratio of 4:3.

11. A projection display apparatus comprising:
- a screen having an inner surface substantially enclosing a three-dimensional space;
- a mirror assemblage further comprising a first reflective face, a second reflective face, and a third reflective face, with said reflective faces sharing a common apex;
- a first projector for projecting a first image onto said first reflective face such that said first image is folded, said first projector being capable of focusing so that said first image is rendered in sharp focus on said inner surface;
- a second projector for projecting a second image onto said second reflective face such that said second image is folded, said second projector being capable of focusing so that said second image is rendered in sharp focus on said inner surface;
- a third projector for projecting a third image onto said third reflective face such that said third image is folded, said third projector being capable of focusing so that said third image is rendered in sharp focus on said inner surface;
- a convex mirror positioned within said three-dimensional space to receive the first image, second image, and third image folded by said mirror assemblage and to disperse said images onto the inner surface of said screen.

12. The projection display apparatus of claim 11 in which said apex of the mirror assemblage lies on the principal axis of said convex mirror.

13. The projection display apparatus of claim 11 in which the screen is substantially spherical and has a central axis in coincident alignment with the principal axis of said convex mirror, and further in which the apex of the mirror assemblage lies on the principal axis of said convex mirror.

14. The projection display apparatus of claim 11 in which the screen is substantially hemispherical and has a central axis in coincident alignment with the principal axis of said convex mirror, and further in which the apex of the mirror assemblage lies on the principal axis of said convex mirror.

15. The projection display apparatus of claim 11 in which the screen is substantially spherical and has a central axis in coincident alignment with the principal axis of said convex mirror, and further in which the apex of the mirror assemblage lies on the principal axis of said convex mirror, and further in which the first projector, second projector, and third projector reside outside said three-dimensional space and wherein the mirror assemblage folds said first image, said second image, and said third image onto said convex mirror through an aperture in said screen without having a lens in the optical path between the mirror assemblage and said convex mirror.

16. The projection display apparatus of claim 11 in which the screen is substantially spherical and has a central axis in coincident alignment with the principal axis of said convex mirror, and further in which the apex of the mirror assemblage lies on the principal axis of said convex mirror, and further in which the first projector, second projector, and third projector reside inside said three-dimensional space and wherein the mirror assemblage folds said first image, said second image, and said third image onto said convex mirror without having a lens in the optical path between the mirror assemblage and said convex mirror.

17. The projection display apparatus of claim 11 in which the first image, second image, and third image are corrected for geometric distortions by using software to modify the signal inputs to the first projector, second projector, and third projector.

18. The projection display apparatus of claim 11 in which the first image, second image, and third image are corrected for uneven brightness by using software to modify the signal inputs to the first projector, second projector, and third projector.

19. A projection display apparatus comprising:
- a screen having an inner surface substantially enclosing a three-dimensional space;
- a mirror assemblage further comprising a first reflective face, a second reflective face, a third reflective face, and a fourth reflective face with said reflective faces sharing a common apex;
- a first projector for projecting a first image onto said first reflective face such that said first image is folded, said first projector being capable of focusing so that said first image is rendered in sharp focus on said inner surface;
- a second projector for projecting a second image onto said second reflective face such that said second image is folded, said second projector being capable of focusing so that said second image is rendered in sharp focus on said inner surface;
- a third projector for projecting a third image onto said third reflective face such that said third image is folded, said third projector being capable of focusing so that said third image is rendered in sharp focus on said inner surface;
- a fourth projector for projecting a fourth image onto said fourth reflective face such that said third image is folded, said fourth projector being capable of focusing so that said fourth image is rendered in sharp focus on said inner surface;
- a convex mirror positioned within said three-dimensional space to receive the first image, second image, third image, and fourth image folded by said mirror assemblage and to disperse said images onto the inner surface of said screen.

20. The projection display apparatus of claim 19 in which said apex of the mirror assemblage lies on the principal axis of said convex mirror and wherein the mirror assemblage folds said first image, said second image, said third image, and said fourth image onto said convex mirror without having a lens in the optical path between the mirror assemblage and said convex mirror.

* * * * *